United States Patent [19]
Heath

[11] 3,834,646
[45] Sept. 10, 1974

[54] TAKE-UP SPOOL LATCH

[75] Inventor: Robert Boyson Heath, St. Marys, Australia

[73] Assignee: Rainsford Metal Products Proprietary Limited, South Australia, Australia

[22] Filed: Nov. 6, 1972

[21] Appl. No.: 303,965

[30] Foreign Application Priority Data
Nov. 9, 1971 Australia.............................. 6940/71

[52] U.S. Cl............ 242/107.7, 242/107.4, 188/82.4
[51] Int. Cl............................................. B65h 75/48
[58] Field of Search.......... 242/107.6, 107.7, 107 R, 242/107.2, 107.3, 107.4, 107.5; 188/82.1, 82.34, 82.7

[56] References Cited
UNITED STATES PATENTS

| | | | |
|---|---|---|---|
| 3,430,891 | 3/1969 | Burleigh........................... | 242/107.4 |
| 3,491,966 | 1/1970 | Curran............................. | 242/107.6 |
| 3,578,260 | 5/1971 | Kell.................................. | 242/107.4 |
| 3,598,335 | 3/1970 | Seeger ............................ | 242/107.4 |
| 3,664,599 | 5/1972 | Partridge ........................ | 242/107.6 |
| 3,682,412 | 8/1972 | Kuszynski...................... | 242/107.4 |

FOREIGN PATENTS OR APPLICATIONS
986,867   8/1951   France............................ 242/107.7

*Primary Examiner*—John W. Huckert
*Assistant Examiner*—Jon W. Henry
*Attorney, Agent, or Firm*—Jay L. Chaskin, Esq.

[57] ABSTRACT

A take-up spool latch for a seat belt retractor of the type comprising a spool journalled for rotataion in a spool frame and incorporating a torsion spring for retracting a seat belt, the latch having a clutch member and a brake member with means between them limiting relative movement, both the clutch and brake members having cam surfaces thereon which are engaged by a pawl which co-operates with a ratchet on the spool and is so arranged that:

a. upon retraction of a seat belt which has been withdrawn from the spool the cam surfaces retain the pawl out of engagement from the ratchet teeth, b. upon initial further withdrawal and during the limited rotation between the brake and clutch member the pawl is released by the cam surfaces and engage the ratchet teeth thereby preventing retraction, c. upon still further withdrawal the cam surfaces again engage the pawl and retain it out of engagement from the ratchet teeth, so that full retraction can again take place.

9 Claims, 10 Drawing Figures

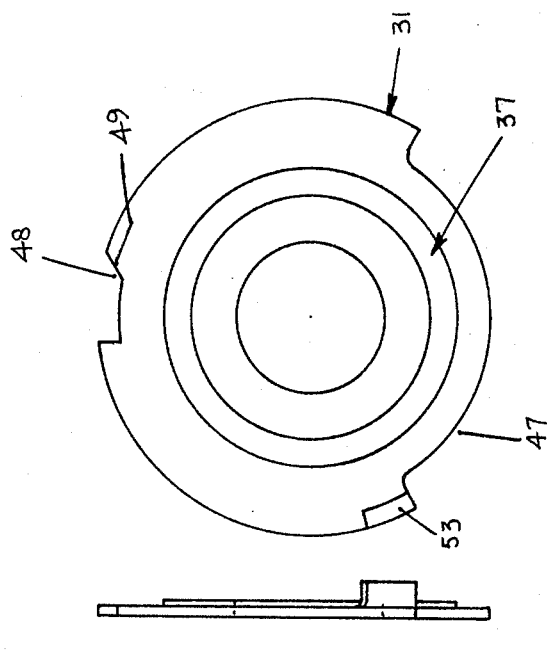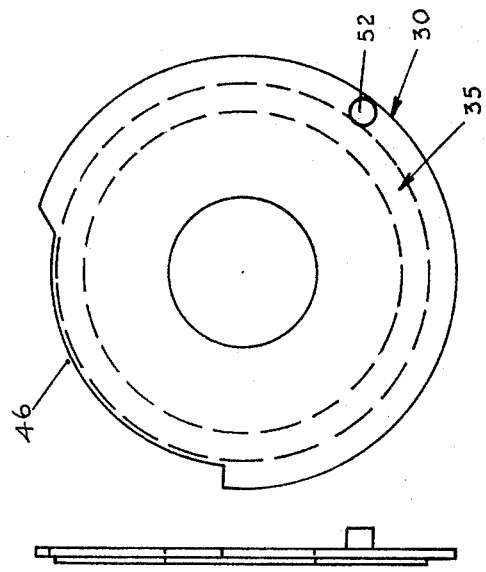

TAKE-UP SPOOL LATCH

This invention relates to a spool latch which is functional to restrict take-up of a spring return seat belt, in such a way as to allow a small degree of freedom of movement wherein the retracting spring is restrained from imparting tension to the seat belt.

RELATED ART

The invention relates to seat belt spools of any one of several types. It is applicable to the type of spool described and illustrated in Australian Pat. No. 273,896 issued to Teleflex Products Limited, a British Company, wherein an internal ratchet is engaged by a centrifugally operable pawl which arrests rotation of a spool upon sudden extension of a seat belt. This type of spool is known as a "body sensitive" spool, that is, it locks when the body of a wearer is suddenly thrown forwardly.

This invention is also applicable to the type of spool known as a "vehicle sensitive" spool. Such spools are described in U.S. Pat. No. 3,578,260. The invention is still further applicable to locking retractors.

As far as is known to the Applicants, there is no related art with respect to mechanism which will allow a small degree of freedom of movement wherein the retracting spring is restrained from imparting tension to the seat belt.

BACKGROUND OF THE INVENTION

In a motor vehicle, if a retractor is used wherein a seat belt will have a continually applied retractor force, the pressure of the belt against the wearer may result in discomfort, and it has been found desirable for the wearer to have the belt at a station which is other than its retracted position but have a small degree of freedom of movement beyond the station, wherein the seat belt is not under tension.

BRIEF SUMMARY OF THE INVENTION

In general terms the invention includes a clutch member and a brake member both of which are coaxial with the spool and re respectively in frictional engagement with the spool and the spool housing, there also being frictional engagement means between the two members. The two members also have interengaging means which limit relative rotation therebetween, and each member is provided with a cam surface. The two cam surfaces control movement of a pawl which is pivoted to the spool frame and which is either in engagement with a ratchet on the spool so as to limit retraction of the spool or lifted out of engagement with the teeth of the ratchet by the cam surfaces so that the spool is free to rotate in either direction. The interengaging means between the clutch and brake members are so arranged in conjunction with the cam surfaces that when a seat belt in retracted by the spool and after it has been withdrawn from the spool, the cam surfaces retain the pawl out of engagement from the ratchet teeth to thereby allow full retraction to take place, but if the seat belt is further withdrawn, during that period of withdrawal when there is limited relative rotation between the clutch and brake members, the pawl is released from engagement with the cam surfaces and engages the ratchet teeth thereby preventing retraction, while upon further withdrawal beyond the limited relative rotation the cam surfaces again engage the pawl and retain it out of engagement with the ratchet teeth. This is possible because of the initial movement of the clutch member only upon withdrawal, but movement of the clutch and brake discs together after the limited relative rotation has ceased because of the functioning of the interengaging means between the clutch and brake members.

More specifically, the invention in one form may be defined as consisting of a take-up spool latch which comprises a clutch member coaxial with the spool of a seat belt retractor, and in frictional engagement with the spool; a brake member coaxial with the spool and in frictional engagement with the spool housing; interengaging means between the clutch and brake members limiting relative rotation therebetween; cam surfaces on both the clutch member and the brake member; a ratchet on the spool; and a pawl pivoted to the spool frame and engaging the cam surfaces of both the clutch and brake members, the interrelation of the interengaging means and the cam surfaces being so arranged that:

a. Upon retraction of a seat belt which has been withdrawn from the spool, the cam surfaces retain the pawl out of engagement from the ratchet teeth, b. upon initial further withdrawal and during said limited relative rotation between the clutch and brake members, the pawl is released by the cam surfaces and engages the ratchet teeth thereby preventing retraction, and, c. upon further withdrawal beyond said limited relative rotation, the cam surfaces again engage the pawl and retain it out of engagement from the ratchet teeth.

With this arrangement the belt withdrawal initially moves the clutch member only, but further withdrawal moves the clutch member and the brake member together while initial retraction returns the clutch member only and continued retraction returns the clutch member and the brake member together, whereby the pawl is engageable with the ratchet teeth only upon initial extension after substantial retraction. Thus the user can move forwardly from his seating position without the need to unlatch his belt, and when he moves rearwardly to the normal position the torque spring will retract the belt. However, upon small forward movement the extent of which is determined by the limited relative rotation of the clutch and brake members, the pawl is released by the cam surfaces to drop into position so that it engages the ratchet teeth on the spool to prevent retraction.

BRIEF DESCRIPTION OF THE SEVERAL VIEWS

A preferred embodiment of the invention is described with reference to a seat belt retractor having a spool frame, a spool journalled for rotation in the spool frame, and a torsion imparting spring operably connected between the spool and the spool frame arranged for retracting a belt when carried on the spool, as for example as described in the aforesaid U.S. Patent.

This embodiment is described with reference to and is illustrated in the accompanying drawings in which:

FIG. 1 is a sectional elevation of a seat belt retractor embodying the take-up spool latch of this invention, FIG. 2 is a partly sectioned end elevation of FIG. 1, FIG. 3 is a fragmentary view which illustrates the manner in which the pawl arrangement functions for limiting withdrawal of a belt upon deflection of an inertia sensing device in the seat belt retractor (FIGS. 1, 2 and 3 generally illustrating the seat belt retractor in chain dotted lines and the take-up spool latch in full lines), FIG. 4 is an end elevation of a clutch member,
FIG. 5 is a front elevation of same,
FIG. 6 is an end elevation of a brake member,
FIG. 7 is a side elevation of same,
FIG. 8 is a diagrammatic "exploded" view showing the brake and clutch members co-operating with a pawl for preventing retraction (after initial withdrawal of a seat belt from either its retracted or any other station), FIG. 9 is a view similar to FIG. 8 showing the relative locations of the brake member, clutch member and pawl after further withdrawal beyond limited relative rotation between the brake and clutch members, and FIG. 10 is a further similar view showing the relative positions of the brake member, clutch member and pawl upon retraction after withdrawal to a position illustrated in FIG. 9.

DETAILED DESCRIPTION OF THE PREFERRED EMBODIMENT

As said, the preferred embodiment is described with respect to a "vehicle sensitive" type of retractor, although not identical to is very similar to the retractor which is described in some detail in the aforesaid U.S. Patent. The seat belt retractor 11 comprises a spool frame 12 in which is journalled a spool 13, there being a torsion spring 14 operably coupled between the spool frame 12 and the spool 13 for retracting a seat belt when wound on the spool 13. The seat belt is not shown herein.

Figure 1:
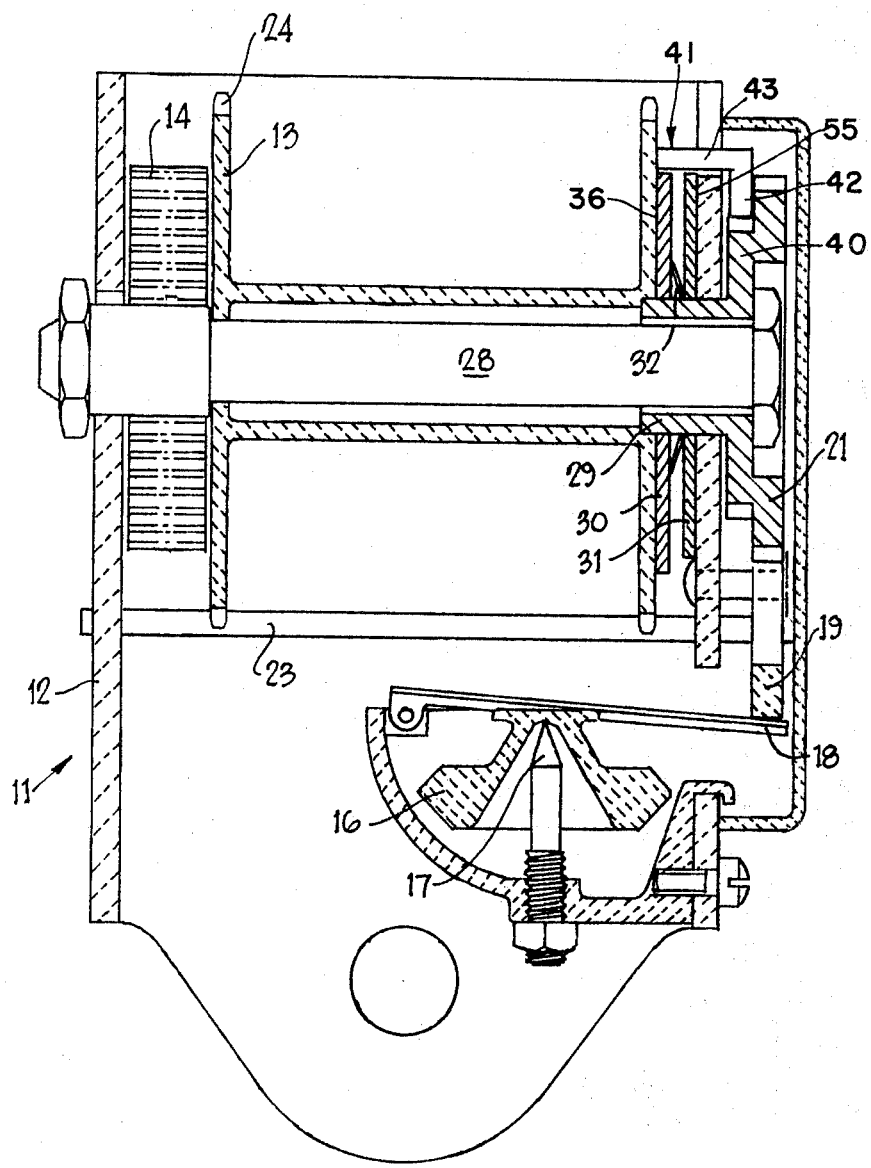
Figure 2:
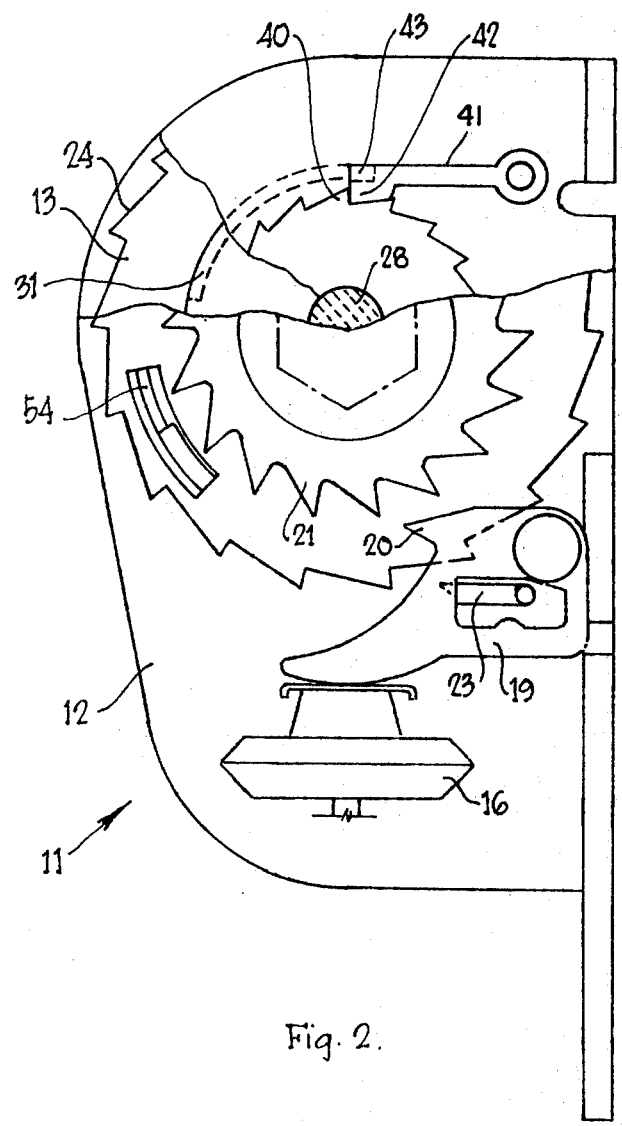
Figure 3:
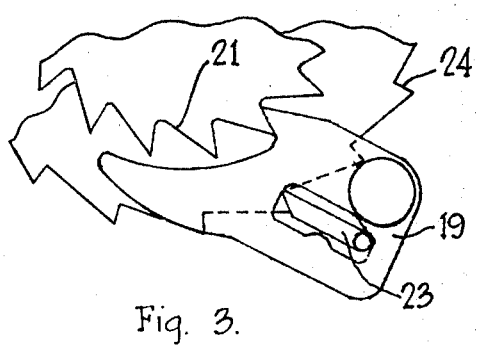

A circular pendulum 16 is carried on a supporting pivot 17, and upon deflection in any direction will lift an actuating arm 18, the pendulum 16 then functioning as an inertia sensing device. The actuating arm 18 will raise a catch plate 19 until a pawl 20 thereon engages a tooth of a primary ratchet plate 21, carried on the spool 13. The primary ratchet plate 21 is formed from resilient deformable material, for example a plastics material, and allows a limited degree of movement. At the same time however as the catch plate 19 is lifted, it rocks a U-shaped bar 23 from the position shown in FIG. 2 to the position shown in FIG. 3, the U-shaped bar 23 engaging ratchet teeth 24 in the peripheries of the end plates of the spool 13. This is a brief description of known art, with the exception of the primary ratchet plate 21, since the primary ratchet plate 21 is integral with a ratchet which forms part of the invention.

Surrounding the spindle 28 of the spool 13 is a bush 29 which rotationally supports a pair of discoid members, one of the discoid members being a clutch disc 30 and the other being a brake disc 31, there being axially applied pressure between the two (by means of a Belleville spring washer 32 or some equivalent thereto) which tends to cause the two discoid members 30 and 31 to rotate together. However, the axially inner discoid member (the clutch disc 30) is provided with an annular friction pad 35 of relatively large diameter bearing against the outer face of the end plate 36 of the spool 13 while the other discoid member (the brake disc 31) is also provided with an annular friction pad 37 which in this instance however, bears against the inner face 53 of a side wall of the frame 12. The effective mean radius of the clutch disc friction pad 35 is greater than the effective mean radius of the friction pad 37 on the brake disc, so that the clutch disc 30, although being capable of slipping against the spool will not slip until after the brake disc 31 has slipped and been arrested. The mean diameter of the Belleville spring washer 32 is less than that of the friction pad 37 on the brake disc, and the spring washer 32 does not transfer sufficient torque to rotate the brake disc 31.

Integral with the bush 29 and the primary ratchet plate 21 is a ratchet disc 40, the ratchet disc 40 having teeth inclined in such a direction as to prevent retraction of a seat belt. (see FIG. 2)

A double lobed pawl 41 is pivoted to the outer wall of the spool frame 12, one lobe 42 of the double lobed pawl 41 engaging the teeth of the ratchet disc 40 and the other lobe 43 extending across the peripheral edges of the two discoid members 30 and 31.

The clutch disc 30 is provided with a cam surface comprising a circumferentially extending radial recess 46, which for simplicity is termed herein "clutch recess" while the brake disc 31 is also provided with a cam surface comprising a circumferentially extending recess 47 (herein called "brake recess") in its periphery, and a pawl recess 48 circumferentially spaced from the brake recess 47. One end of the pawl recess 48 terminates in a wall 49 which is inclined to the radial.

Disposed between the clutch disc 30 and the brake disc 31 is an interengaging means for limiting relative rotation therebetween.

The clutch disc 30 has a projecting circular section spigot 52 (herein called "clutch spigot") which, upon assembly, is movable within and intergengages the brake recess 47. Disposed further between the brake disc 31 and the spool frame 12 is means for limiting the rotary movement of the brake disc 31. Brake disc 31 has an outstanding lug 53 (herein called "brake lug") which is movable within and interengages an arcuate slot 54 in the side wall of the spool frame 12.

The function is briefly as follows.

Figure 9:
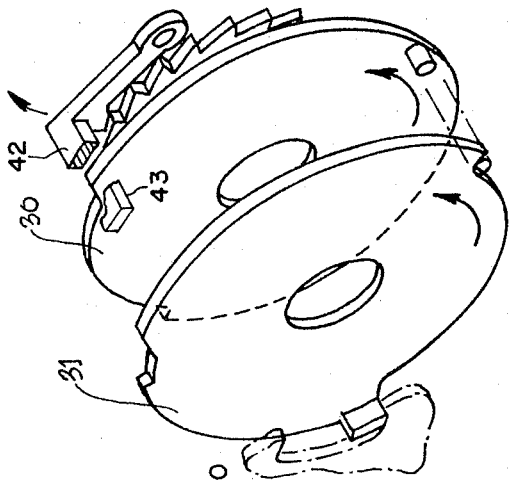
Figure 8:
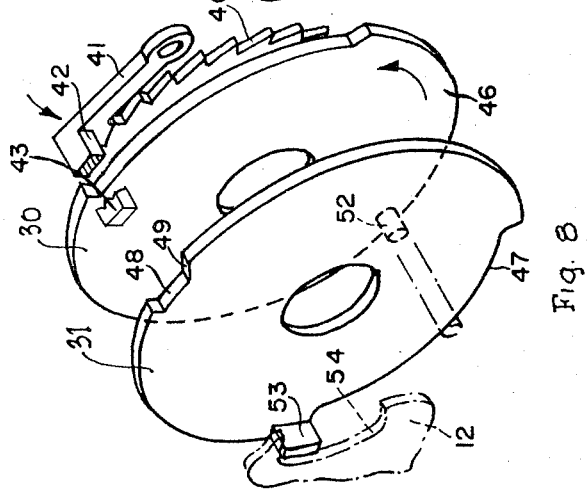

Upon initial withdrawal of the seat belt from either its retracted position or from any other station the clutch disc 30 is rotated by frictional inter-connection with the spool 13 and allows the inner pawl lobe 43 to fall into the now aligning clutch recess 46 and "pawl recess" 48 (which are of similar diameter) and so allows the outer pawl lobe 42 to engage the ratchet teeth. At this stage retraction would be prevented, this stage being illustrated in FIG. 8. Further withdrawal will continue to rotate the clutch disc 30 only in an anticlockwise direction as shown in FIG. 8 until the clutch spigot 52 abuts the end of the brake recess 47. To this point the angular length of the clutch recess 46 allows continued engagement of the pawl 41 with the teeth of the ratchet disc 40 and retraction is incrementally prevented. Continued withdrawal rotates the brake disc 31 together with the clutch disc 30 by interengagement between the clutch spigot 52 and the brake recess 47 until the brake disc 31 is brought to a halt by the brake lug 53 traversing and abutting the end of the "arcuate slot" 54. This small rotation of the brake disc 31 brings the inclined wall 49 of the pawl recess 48 under the inner lobe 43 of the pawl 41 and lifts the pawl to disengage with the ratchet teeth, which will now allow retraction. Still further withdrawal will cause slippage between the spool and the clutch disc but limited or complete retraction is still possible. This stage is illustrated in FIG. 9.

Figure 10:
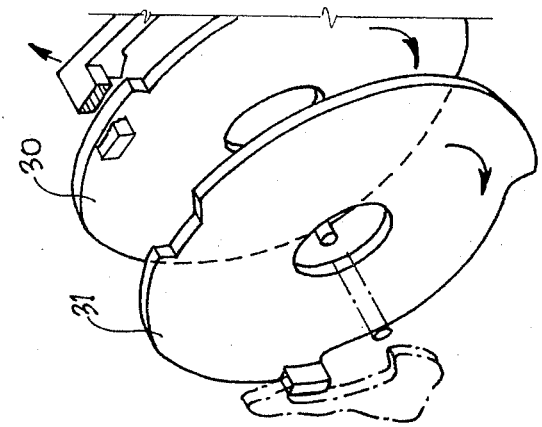

During the first stage of retraction the clutch disc 30 is rotated back by its frictional inter-connection with the spool 13 to the limit of the travel of the clutch spigot 52 in the brake recess 47 and brings the clutch recess 46 and the pawl recess 48 into mis-alignment which continues to hold the pawl 41 disengaged from the teeth of the ratchet disc 40. Further retraction will rotate both the brake disc 31 and the clutch disc 30 to the limit of travel of the brake lug 53 in the arcuate slot 54 and so bring the pawl recess 48 again into alignment with the inner lobe 43 of the pawl 41. However, the pawl 41 is now prevented from engaging the ratchet teeth by the outer peripheral edge of the clutch disc 30, at the end of the clutch recess 46. This is illustrated in FIG. 10.

During further retraction slippage occurs between the clutch disc 30 and the spool 13 under the effect of the torsion spring 14.

However, upon arresting of the retraction of the belt (due, for example, to the belt engaging the body of the user) rotation ceases, and slight forward movement of the user will cause the clutch disc 30 to move in a direction such that the clutch recess 46 again aligns with the pawl recess 48, the inner lobe 43 of the pawl 41 is no longer prevented from dropping and the outer lobe 42 is then allowed to drop to engage the teeth of the ratchet disc 40. This then gives the user an opportunity to relax the tension of the belt without losing any of its safety features.

The pawl 41 has been described as functioning under the effects of gravity but it will be clear to those skilled in the art that use of a light spring may be made, if required. The operative mechanism has been described with respect to a pair of discs, but their equivalents (for example, conical or cylindrical members) may be used if this is desired.

What I claim is:

1. In a seat belt retractor having a spool frame, a spool journalled for rotation in the spool frame, and a torsion imparting spring operably connected between the spool and the spool frame arranged for retracting a belt when carried on the spool, a take-up spool latch comprising:
   a clutch member coaxial with the spool and in frictional engagement with the spool,
   a brake member coaxial and rotatable with respect to the spool and in frictional engagement with the spool frame,
   interengaging means between the clutch and brake members limiting relative rotation therebetween,
   cam surfaces on both the clutch member and the brake member,
   a ratchet having ratchet teeth on the spool, and
   a pawl pivoted to the spool frame for engaging the cam surfaces of both the clutch and brake members and the ratchet teeth, the cam surfaces controlling the engagement of the pawl with the ratchet teeth such that:
   a. upon retraction of a seat belt which has been withdrawn from the spool, the cam surfaces pivot the pawl out of engagement with the ratchet teeth,
   b. upon initial further withdrawal and during said limited relative rotation between the clutch and brake members, the pawl is released by the cam surfaces and pivots to engage the ratchet teeth thereby preventing retraction, and
   c. upon further withdrawal to and beyond said limited relative rotation accomplished by the interengaging means, the cam surfaces again engage the pawl and pivot it out of engagement with the ratchet teeth.

2. A take up spool according to claim 1 wherein the clutch member and brake member are both discoid members, said cam surfaces being peripheral surfaces of said respective said discoid members.

3. A take up spool according to claim 2 wherein the spool includes an end plate and each said discoid member is provided with an annular friction pad, the friction pad of said clutch member bearing against said end plate of the spool, the friction pad of said brake member bearing against the spool frame, the effective mean radius of the friction pad of the clutch member being greater than the effective mean radius of the friction pad of the brake member, and a spring between the clutch and brake members effecting said frictional engagements.

4. A take up spool according to claim 2 wherein said interengaging means between the clutch and brake members includes a spigot outstanding from a face of one said members movable in a circumferential recess in the periphery of the other said member.

5. A take up spool according to claim 2 wherein said pawl is a double lobe pawl, one lobe extending over the peripheries of both said discoid members, the other lobe being that portion of said pawl which is releasably engagable in the said ratchet teeth.

6. A take up spool according to claim 2 further comprising a brake lug projecting from a face of the brake disc, and an arcuate slot in the spool frame, the brake lug being movable in the arcuate slot but said movement being limited by the ends of said slot.

7. In a seat belt retractor having a spool frame, a spool journalled for rotation in the spool frame, and a torsion imparting spring operably connected between the spool and the spool frame arranged for retracting a belt when carried on the spool, a take up spool latch comprising:
   a clutch disc and a brake disc both coaxial and rotatable with respect to the spool,
   a spring between said discs urging the clutch disc into frictional engagement with the spool and the brake disc into frictional engagement with the spool frame,
   interengaging means between the brake disc and the spool frame limiting rotary movement of the brake disc,
   a radially inwardly extending pawl recess in the periphery of the brake disc, a radially inwardly extending recess in the periphery of the clutch disc of greater circumferential length than the pawl recess, said peripheries and recesses forming co-operating cam surfaces,
   a spigot outstanding from a face of one of the discs, and co-operable limit means on the other disc engageable by the spigot to thereby limit relative rotation of discs to a degree exceeding said limited rotary movement of the brake disc,
   a ratchet having ratchet teeth on the spool,
   a pawl pivoted on the spool frame arranged to engage the ratchet teeth and also to engage the cam surfaces, the inter-relation of said interengaging means, cam-forming recesses and limit means being so arranged that:

a. upon retraction of a seat belt which has been withdrawn from the spool, the clutch disc is urged to rotate owing to said frictional engagement with the spool and the brake disc is urged by the spigot to rotate, whereby the pawl recess moves into alignment with the pawl but the cam surface of the clutch disc pivots the pawl out of engagement with the ratchet teeth, b. upon initial further withdrawal of the seat belt from the spool and during said limited relative rotation between said clutch and brake discs the clutch disc is urged to rotate in a reverse direction to place its radially inwardly extending recess into alignment with the pawl, whereby the pawl pivots to engage the teeth of the ratchet, and, c. upon further withdrawal beyond the limit of said limited relative rotation of the discs, the spigot of the clutch disc imparts rotation to the brake disc and the cam surface of the brake disc lifts and pivots the pawl out of engagement with the ratchet teeth.

8. A take up spool lug according to claim 7 wherein said clutch disc has a clutch friction pad thereon in frictional engagement with said spool; said brake disc has a brake friction pad thereon in frictional engagement with said spool frame, the clutch friction pad being displaced further from the spool axis than the brake friction pad whereby the clutch friction pad transmits more drive torque than the brake friction pad and upon spool rotation the clutch disc causes rotary movement of the brake disc.

9. A take up spool lug according to claim 7 wherein said spigot is outstanding from a face of the clutch disc and lies within a further radially inwardly extending recess in the brake disc, the ends of which recess constitute with the spigot said co-operable limit means.

* * * * *